United States Patent

Matsufuji et al.

[11] Patent Number: 6,138,833
[45] Date of Patent: Oct. 31, 2000

[54] PLACER GOLD MINING METHOD, PLACER GOLD MINING BOAT USED IN THIS METHOD, PLACER GOLD DIGGING AND SEPARATING METHOD AND SYSTEM THEREFOR, AND PLACER GOLD SEPARATING METHOD AND SYSTEM THEREFOR

[75] Inventors: Tamisuke Matsufuji, Tokyo; Haruo Kojima, Toki, both of Japan

[73] Assignee: Jipangu Inc., Tokyo, Japan

[21] Appl. No.: 09/299,004

[22] Filed: Apr. 26, 1999

Related U.S. Application Data

[62] Division of application No. PCT/JP98/03781, Aug. 26, 1998.

[30] Foreign Application Priority Data

Aug. 27, 1997 [JP] Japan ............................ 9-231332

[51] Int. Cl.$^7$ .................. B03B 7/00; E02F 3/94
[52] U.S. Cl. ............... 209/10; 209/39; 209/44; 209/214; 209/458; 37/318; 37/323
[58] Field of Search ............... 209/44, 156, 213, 209/214, 224, 458, 10, 39; 37/307, 317, 318, 323

[56] References Cited

U.S. PATENT DOCUMENTS

| | | | |
|---|---|---|---|
| 3,761,132 | 9/1973 | Grable | 209/44 X |
| 3,950,030 | 4/1976 | Girden | 209/458 X |
| 4,264,105 | 4/1981 | Thompson | 37/318 X |
| 4,416,771 | 11/1983 | Henriques | 209/224 |
| 4,726,895 | 2/1988 | Martinez | 209/214 X |
| 5,205,414 | 4/1993 | Martinez | 209/214 X |
| 5,273,162 | 12/1993 | Riherd | 209/44 X |
| 5,927,508 | 7/1999 | Plath | 209/215 X |

FOREIGN PATENT DOCUMENTS

| | | |
|---|---|---|
| 102341 | 8/1933 | Japan . |
| 14-12903 | 8/1939 | Japan . |
| 15-929 | 1/1940 | Japan . |
| 37-6316 | 4/1962 | Japan . |
| 57-11254 | 3/1982 | Japan . |

*Primary Examiner*—Tuan N. Nguyen
*Attorney, Agent, or Firm*—Wenderoth, Lind & Ponack, L.L.P.

[57] ABSTRACT

A placer gold separating method includes subjecting placer gold-and gold ore-containing sand and gravel layers accumulated on the bottom of the water of a river and placer gold- and gold ore-containing sand and gravel layers formed deep in the ground to excavation or suction excavation by utilizing a water pressure difference. This causes a mixture of the excavated or suction excavation placer gold- and gold ore-containing sand, gravel and water to flow horizontally by the action of a pressure fluid. The placer gold and gold ores are separated by utilizing a specific gravity difference while the mixture is flowing. A placer gold mining boat used to practice this method is provided thereon with a combination of a suction excavation component, a mixture transfer component, a component for separating placer gold by utilizing a specific gravity difference, and a component for discarding the remaining mixture from which the placer gold has been separated. A placer gold separating method is characterized by causing a mixture of placer gold and gold ores or pulverized gold ores and water to flow in a metallic cylinder. A magnetic field is generated by a magnetic field generating component provided on an outer circumferential surface of the metallic cylinder, and the placer gold in the mixture is magnetically deposited on the inner surface of the metallic cylinder, whereby the placer gold is separated.

10 Claims, 14 Drawing Sheets

PLACER GOLD MINING METHOD, PLACER GOLD MINING BOAT USED IN THIS METHOD, PLACER GOLD DIGGING AND SEPARATING METHOD AND SYSTEM THEREFOR, AND PLACER GOLD SEPARATING METHOD AND SYSTEM THEREFOR This is a Divisional Application of International Application Ser. No. PCT/JP98/03781, filed Aug. 26, 1998.

FIELD OF THE INVENTION

The present invention relates to a method and system for mining a placer gold and/or gold mineral deposit (in the specification, the placer gold or gold mineral deposit, or the placer gold and gold mineral deposit will be referred to collectively as "the placer gold etc." hereinafter). The method includes excavating the sand, gravel and like layers containing the placer gold etc. by suction and bringing the placer gold etc. up to the ground surface level, transporting the sand layer etc. at a specific flow rate, and separating the placer gold etc. by making use of the difference in the specific gravity during the transportation. Furthermore, the present invention relates to a method and system for separating the placer gold etc. designed for selecting the placer gold etc. by separating the placer gold etc. from rocks or a mixture of minerals containing the placer gold etc. by making use of the magnetic force.

BACKGROUND OF THE INVENTION

In most of the conventional arts, in order to extract the placer gold etc. from the sand layer in rivers (including lakes and marshes as well as rivers) containing the placer gold etc., the placer gold etc. are separated by washing the sand taken up by human labor, and the placer gold etc. are separated by elutriating the sands and like collected by excavating the sand layer containing the placer gold etc.

The excavation described above is performed by using machinery, and no excavating means is available in cases where the layer containing the placer gold etc. is located deep in the earth. In such cases, it would be possible to employ the existing technologies, for example, if a large hole is made by digging the earth deeply, and only the sand layer containing the placer gold etc. is excavated, separated and transported, but this method is not cost-justified. Thus, any layer containing the placer gold etc. that is located deep in the earth is left untouched.

Since the placer gold etc. are separated by elutriating the sands collected by excavating the sand layer containing the placer gold etc. as described above, extensive facilities are required, but it is difficult to improve the efficiency. No epoch-making method for separating the placer gold etc. has yet been proposed.

The conventional elutriation that is performed by the human labor not only involves heavy labor, but it is also not efficient, and there is a problem in that it is not cost-justified for those sand layers which contain a smaller proportion of the placer gold etc. When the sands obtained by the mechanical digging are elutriated, an enormous amount of sands must be elutriated, and it would not be cost-justified except for those sand layers which contain a relatively large proportion of the placer gold etc. It would only be cost-justified for those sand layers, in particular, which contain a very large amount of the placer gold etc.

The layers that are at present known as containing the placer gold etc. are presumed to be deposited 1000 m or more down from the ground surface level, and the excavation is currently limited to the depth of 5 m to 10 m from the gound surface leve. For the regions where the undergound water level is located 5 m to 10 m deep, in particular, it is thought that the cost justification cannot be realized when the sand layer is excavated more deeply than the underground water level. Such regions are now wasted. In other words, the excavating method and the transporting method that are now available would not be cost-justified for those layers containing the placer gold etc. which are located 1000 m or more down from the ground surface level.

The conventional separation by elutriation that makes use of the difference in the specific gravity of the placer gold etc. and other mineral substances (i.e., the so-called selection by specific gravity) consists of letting the placer gold etc. drop together with water over the wide region, and separating the placer gold etc. by elutriation. This separation process is not efficient, and has problems in that it requires not only a large area for separation, but also lots of labor since human labor is involved in collecting the placer gold etc. separated by elutriation when this process occurs on the mass production basis. This leads to a higher production cost. The conventional separation by elutriation, which is based on the selection by specific gravity, employs the natural dropping (by the head of water) system. The forced delivery that occurs in large quantities by using a pump and the like has not been proposed yet.

DISCLOSURE OF THE INVENTION

The present invention has solved the problems of the prior art described above, by saving the labor required for separating the placer gold etc. and allowing for the mass production process, which can be achieved by excavating the sand layer (a mixture including the placer gold etc., sand, soils, various mineral substances, rocks and the like (which will herein be referred to as "sands") containing the placer gold etc., forcing the sands obtained by excavating the sand layer to flow, and separating the placer gold etc. by making use of the difference in the specific gravity.

Namely, the present invention has solved both the problem of transporting the sands and the problem of excavating the sands from deep in the water, by introducing the mixture of the sands and water into the transport pipe and accelerating the flow rate of the mixture through the transport pipe by applying a pressurized fluid (for example, pressurized air).

Specifically, the method for mining and separating the placer gold etc. as proposed by the present invention may be characterized by lifting the mixture of the sands containing the placer gold etc. and water by suction, accelerating the flow rate of the mixture by supplying the jet fluid, and separating the placer gold etc. by making use of the difference in the specific gravity while the mixture is being transported. More specifically, it is the method for mining and separating the placer gold etc. that may be characterized by inserting a sand lifting pipe for lifting the mixture of sands containing the placer gold etc. and water down to a predetermined depth of the earth, forcing the bottom end of the sand lifting into the sand layer containing the placer gold etc., applying a suction force into the top end of the sand lifting pipe for bringing the mixture of the sands containing the placer gold etc. and water up to the ground surface level, accelerating the flow rate of the mixture by supplying a jet fluid on the ground surface and forcing it to flow in the horizontal direction, changing the flow rate of the mixture while it is flowing, and separating the placer gold etc. by making use of the difference in the specific gravity. In the foregoing description, when any layer other than the sand layer, such as a clay layer, is encountered when trying to force the bottom end of the sand lifting pipe into the sand layer containing the placer gold etc., a pressurized fluid may be jetted from the bottom end of the sand lifting pipe, thereby crashing such clay layer and boring it. This may be continued until the bottom end of the sand lifting pipe reaches the sand layer containing the placer gold etc.

The method for mining and separating the placer gold etc. as described above may be practiced by a system that will be described below. The system is the system for mining and separating the placer gold etc. that may be characterized by connecting, to the top end of the sand lifting pipe for lifting a mixture of sands containing the placer gold etc. and water up to the ground surface level, one end of the transport pipe for transporting the mixture in the horizontal direction on the ground surface level. Near the connection between the above two pipes, an accelerator means is provided for accelerating the flow of the mixture, and several separator means for separating the placer gold etc. by making use of the difference in the specific gravity are connected in series to the forward end of the transport pipe. In this case, it is possible to automatically lift the mixture through the sand lifting pipe, by reducing the pressure on the upper side of the sand lifting pipe, and it is also possible to blow a pressurized air in the traveling direction of the mixture being lifted, thereby applying a pressure to accelerate the flow rate of the mixture. The separator means for separating the placer gold etc. by making use of the difference in the specific gravity may be arranged such that the flow rate of the mixture may be varied at the enlarged cross sectional area of the transport pipe by varying the cross section area of the transport pipe, thereby allowing the placer gold etc. to settle there. A funnel for accepting the placer gold etc. may be provided contiguously to the point where the placer gold etc. are allowed to settle, an outlet port may be provided on the bottom of the funnel, and an opening/closing lid may be provided on the outlet port. In this way, the placer gold etc. in the funnel may be collected by opening and reclosing the lid.

By providing the accelerator means for accelerating the flow rate of the mixture at any convenient point of the transport pipe, it is possible to transport the mixture through the transport pipe smoothly and easily, even if the transport pipe extends over a long distance.

The present invention allows the mixture of the sands and water (containing 60% to 80% of water, for example) to be introduced into the transport pipe, through which the mixture can flow at a higher flow rate by supplying the pressurized fluid (such as the pressurized air or pressurized water, for example). Thus, any solids that are equal to as large as 80% of the internal diameter of the transport pipe can flow easily.

From the economical aspect, the preferred flow rate of the mixture when it is flowing is 1 m/sec to 5 m/sec, which range may be used for practical purposes. However, it may depend on the diameter of the transport pipe, the pressure of the pressurized fluid (such as pressurized air or pressurized water), and the depth of the sand layer being inserted by the sand lifting pipe, i.e., the depth to be excavated. The flow rate of 2 m/sec to 3 m/sec should be practically acceptable under all different conditions.

Theoretically, there are no particular restrictions on the internal diameter of the transport pipe, but the internal diameter should conveniently range between 3 m and 1 m when the efficiency and the easiness of handling are considered.

If it is assumed, for example, that the transport pipe has the internal diameter of 0.6 m, the flow rate is 3 m per second, and a mixture of sands and water containing 75% of water is transported, the result would be as follows. The amount of the mixture that can be transported would be 0.84 cubic meters for one second, 50.8 cubic meters for one minute, 3,052 cubic meters for one hour, and 30,000 cubic meters for 10 hours. If the water contained in the mixture is 75%, the amount of sands that can be transported for 10 hours would be equal to 7500 cubic meters (about 19,000 tons).

As described above, the sands that are equal to nearly 20,000 tons can be excavated and transported for 10 hours. The content of the placer gold in the sand layer ranges so widely that it is generally difficult to determine it. If the content is equal to 0.1% (such poor mine is currently said not to be cost-justified), nearly 20 tons of placer gold etc. per day may be mined when the system of the present invention is running for 10 hours.

In accordance with the present invention, it is assumed that the water level is 5 m and the bottom end of the sand lifting pipe is located 100 m deep when the sand lifting pipe is installed vertically, the bottom end would then be placed under a water pressure equal to a water column of 95 m. Therefore, if the mixture of the sands and water lying 25 m deep from the ground surface level is drawn by suction from the tip end of the sand lifting pipe so that the mixture can be removed, the mixture of the sands and water would be rising through the sand lifting pipe by a pressure difference of a water column of 20 m. This remains the same even when the bottom end of the sand lifting pipe is located 200 m to 300 m deep. Thus, if the sand lifting means always provides the energy sufficient to remove the mixture of the sands and water located between the ground surface level and the depth of 25 m, the sand layers located at depths of 100 m, 200 m, and so on can be excavated continuously. This means that the sand layers containing the placer gold etc. located at a great depth can be excavated with remarkably small energy, and the placer gold etc. can be separated.

According to the present invention, a large amount of sands can advantageously be processed efficiently and automatically, because the sands containing the placer gold etc. can be raised by suction from an area deep in the earth, and the placer gold etc. can be separated by making use of the difference in the specific gravity while the mixture of the sands and water thus raised is being transported in the horizontal direction through the transport pipe. The placer gold etc. can also advantageously be mined on a cost justification basis from those waste mines which heretofore have been unable to be excavated, because the mixture of sands and water can be raised from the sand layer existing very deeply in the earth and the placer gold etc. can be separated automatically.

Furthermore, the present invention recognizes that the placer gold etc. has the less ferromagnetic property, and has succeeded in magnetically attaching and separating the placer gold etc. by utilizing a high magnetism. In addition, the present invention has solved the prior art problems by making the gold mining operations fully automatic, more efficient and less costly.

Specifically, the method for separating the placer gold etc. as proposed by the present invention may be characterized by delivering a mixture of sands containing the placer gold etc. and water into the magnetic fields, magnetically attaching it, and separating it. More specifically, the present invention provides a method for separating the placer gold etc. which may be characterized by delivering the mixture of the sands containing the placer gold etc. into a transport pipe where the magnetic fields are generated, magnetically attaching the placer gold etc. to the inner wall of the transport pipe, discharging the rest of the mixture of the sands and water separated from the placer gold etc. into a particular point through the transport pipe, and deenergizing the magnetic fields thereby to remove the magnetic attachment of the placer gold etc. to the inner wall of the transport pipe, delivering a cleaning fluid into the transport pipe, moving the placer gold etc. together with the cleaning fluid to the particular point, and collecting it from that point. In the foregoing, the mixture of the sands containing the placer gold etc. and water, and the cleaning fluid can flow through the transport pipe by applying a pressure which causes the mixture and fluid to flow. The mixture of the sands containing the placer gold etc. and water preferably contains 70% to 90% of water, and water may be used as the cleaning fluid. The magnetic fields preferably have a strength of 5000 gauss to 2000000 gauss.

The method for separating the placer gold etc. as described above may be practiced by a system that is described below. The system may be characterized by providing a mixing means for forming a mixture composed of sands containing the placer gold etc. and water, a delivery means for delivering the mixture into a metallic cylindrical container, a magnetic filed generator means arranged around the outer periphery of the metallic cylindrical container, a delivering means for delivering a cleaning fluid into the metallic cylindrical container, a means for delivering the rest of the mixture separated from the placer gold etc. into a discharge container, and a discharging means for discharging a mixture of the separated placer gold etc. and cleaning fluid, all of which are connected in series. In the foregoing, the delivery means for delivering the mixture into the metallic cylindrical container may be arranged to cause the flow motion of the mixture by blowing a jet fluid or by means of a pump, and the delivery means for the cleaning fluid may be arranged to deliver the cleaning fluid by means of a pump. The magnetic field generator means described above may include a plurality of units each capable of producing a magnetic field having a different strength ranging between 5000 gauss and 200000 gauss, and the units are arranged one after another around the outer periphery of the metallic cylindrical container in the flow direction of the mixture. Those magnetic field generator units may be arranged to be energized or deenergized all at once or individually.

In the system described above, a plurality of electromagnetic coil units for providing a magnetic field of a different strength may also be arranged around the outer periphery of the metallic cylindrical container. For example, four electromagnetic coil units each capable of producing a magnetic field of a strength, such as 5000 gauss, 20000 gauss, 50000 gauss and 200000 gauss, may be provided, and any particular electromagnetic coil unit, such as the one capable of producing the magnetic field of 5000 gauss, may be energized, or all four of the electromagnetic coil units may be energized concurrently.

In the above description, as the placer gold etc. contain less ferromagnetic particles, a less ferromagnetic mineral containing the placer gold or gold may tend to be magnetically attached to the inner wall portion of the metallic cylindrical container that corresponds to the area where the magnetic field of 200000 gauss or 50000 gauss is produced, and a ferromagnetic mineral substance containing gold may tend to be magnetically attached to the inner wall portion of the metallic cylindrical container that corresponds to the area where the less strong magnetic field, such as 5000 gauss, is produced. Thus, the placer gold or gold may be separated from the other mineral substances in the mixture. It may be understood that the less ferromagnetic mineral containing the placer gold and gold, and the ferromagnetic mineral containing gold can be separated efficiently, independently of each other, and without interfering with each other.

As it is described in further details, the ferromagnetic particles/matter can be magnetically attached sufficiently at 5000 gauss. For certain gold minerals and the like that contain both the ferromagnetic particle/matter and the nonferromagnetic particles/matter, however, the strength of the magnetic force may differ, depending on the amount of the ferromagnetic particles/matter contained in the gold mineral. Thus, the gold minerals and the like that contain both the ferromagnetic particles/matter and the nonferromagnetic particles/matter tend to be magnetically attached at 20000 gauss or 50000 gauss, whereas the less ferromagnetic particles/matter such as the placer gold tend to be magnetically attached at 50000 gauss or 200000 gauss. For example, for certain nonferromagnetic minerals containing the placer gold particles, the strength of the magnetic force may become smaller, they tend to be magnetically attached at 200000 gauss. For certain ferromagnetic minerals containing the placer gold particles, on the other hand, they may tend to be magnetically attached even at 5000 gauss to 20000 gauss.

As described above, the position at which the gold particles in the placer gold etc. are to be magnetically attached as well as the degree to which they are to be magnetically attached may differ, depending on the condition of the gold particles. For the same placer gold bed or the gold mineral in the same mine, the condition of the placer gold etc. should be uniform, and so any appropriate separating method that is more efficient may be chosen by performing a separating test beforehand. The strength of the magnetic field that is optimal for the condition of the particles of the placer gold etc. may also be chosen. Of course, any combination of 5000 gauss, 10000 gauss, 20000 gauss, and 50000 gauss may be chosen, or any other magnetic field strength may be chosen.

The individual electromagnetic coil units that are capable of producing the respective magnetic fields of a different strength may be energized (for activating the magnetic field) and deenergized (for inactivating the magnetic field) individually, independently of each other, so that only the placer gold etc. magnetically attached to the inner wall portion of the metallic cylindrical container that corresponds to the area where the appropriate electromagnetic coil unit is located may be removed by the cleansing fluid. Therefore, only the less ferromagnetic mineral containing the placer gold or gold may be separated from the mixture, or the ferromagnetic mineral containing gold may be separated from the mixture. Even when a different amount of the placer gold etc. is magnetically attached to the inner wall portion of the metallic cylindrical container that corresponds to the area where each electromagnetic coil unit is located, those different amounts of the placer gold etc. may be removed off and separated individually by energizing or deenergizing the electromagnetic coil units individually, without affecting the separating operation for each unit.

The delivery of the mixture may be made by using a jet fluid or a pump. To facilitate this delivery, the content of the water in the mixture should preferably be equal to between 70% and 90%.

According to the present invention, the placer gold etc. can advantageously be magnetically attached and separated in a simplified and efficient manner from the mixture of the sands containing the placer gold etc. and water that is being delivered continuously.

Advantageously, the delivery of the mixture of the sands containing the placer gold etc. and water, the magnetic attachment and separation of the placer gold etc., the delivery of the cleaning fluid, and the removal of the separated placer gold etc. can be achieved by the full automatic operation.

DETAILED DESCRIPTION OF THE INVENTION

Embodiment 1

Figure 1:
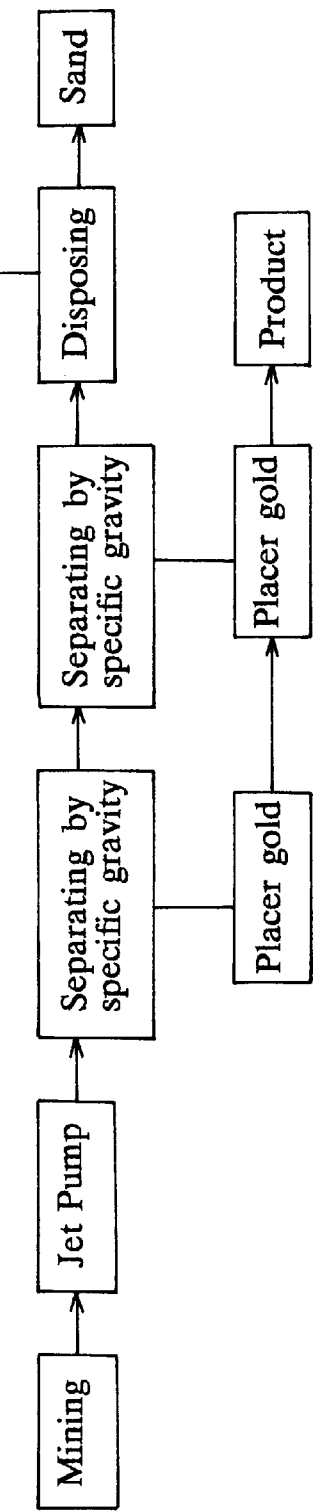
FIG. 1 is a block diagram showing a first embodiment of the present invention.

One embodiment of the present invention is described by referring to FIG. 1.

A mixture composed of sands containing the place gold etc. excavated by suction, or mined, from the bottom of a body of water is transported by a transport pipe equipped with a jet pump (e.g., transported at the rate of 1 to 5 m/sec). Then, the placer gold etc. are separated from the sand by using the difference in the specific gravity, and this separation is performed in the portion of the transport pipe which has an enlarged cross sectional area (separator box). For example, if the separator box is formed by increasing the cross sectional area of the transport pipe by 20%, the flow rate of the mixture of the sands and water that was transported at the flow rate of 3 m/sec. may be reduced to 2.4 m/sec. in the portion of the transport pipe which has the enlarged cross sectional area (separator box), thus allowing the placer gold etc. in the flowing mixture to settle within the separator box. If two such separator boxes (the enlarged cross sectional portions of the pipe) for separating the placer gold etc. by using the difference in the specific gravity are provided in series, the placer gold etc. having relatively gross sizes (or granular placer gold etc.) may be allowed to settle within the first separator box, and the placer gold etc. having relatively less gross sizes may be allowed to settle within the second separator box. Then, the placer gold etc. having the gross sizes and the placer gold etc. having less gross sizes are mixed together or are collected separately, and the placer gold product is obtained. The rest of the mixture from which the placer gold etc. have been separated may be returned to the water so that it can refill the water bottom that was excavated.

Embodiment 2

Figure 2:
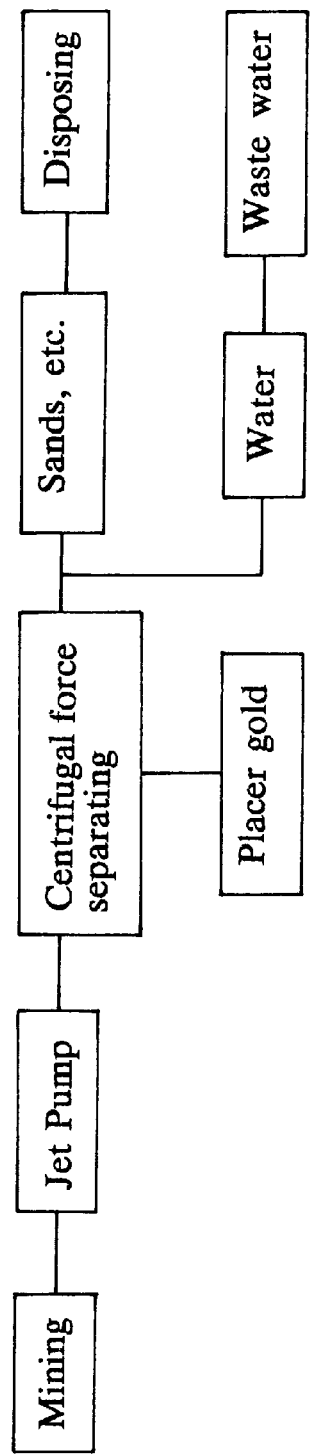
FIG. 2 is a block diagram showing a second embodiment of the present invention.
Figure 3:
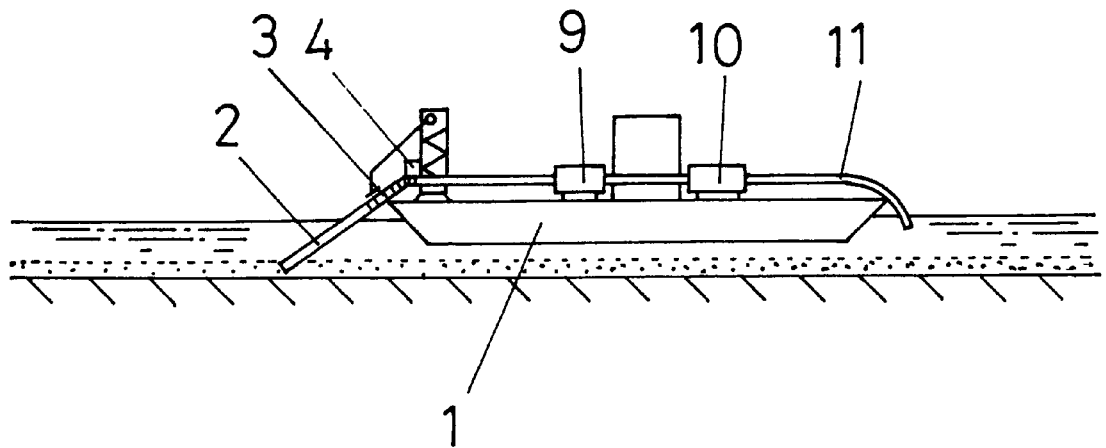
FIG. 3 is a side view for illustrating a boat for mining the placer gold etc. according to the present invention.
Figure 4:
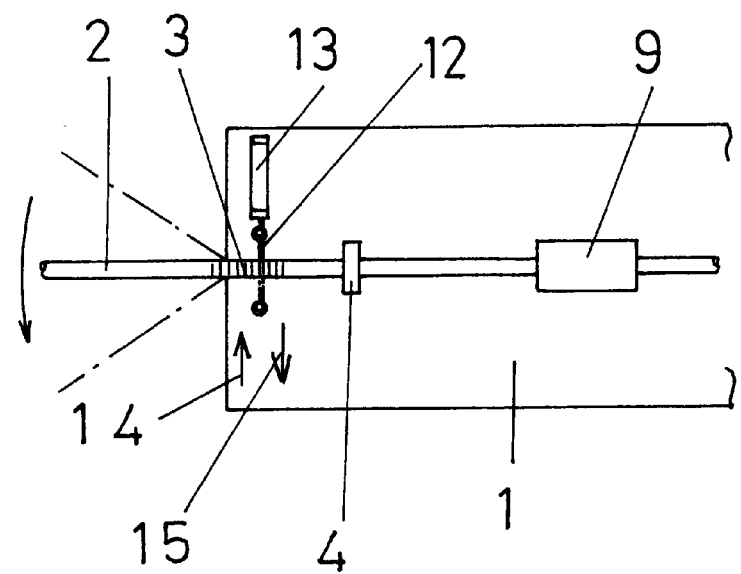
FIG. 4 is a partly enlarged plan view showing how a suction pipe is installed on the boat for mining the placer gold etc.
Figure 5:
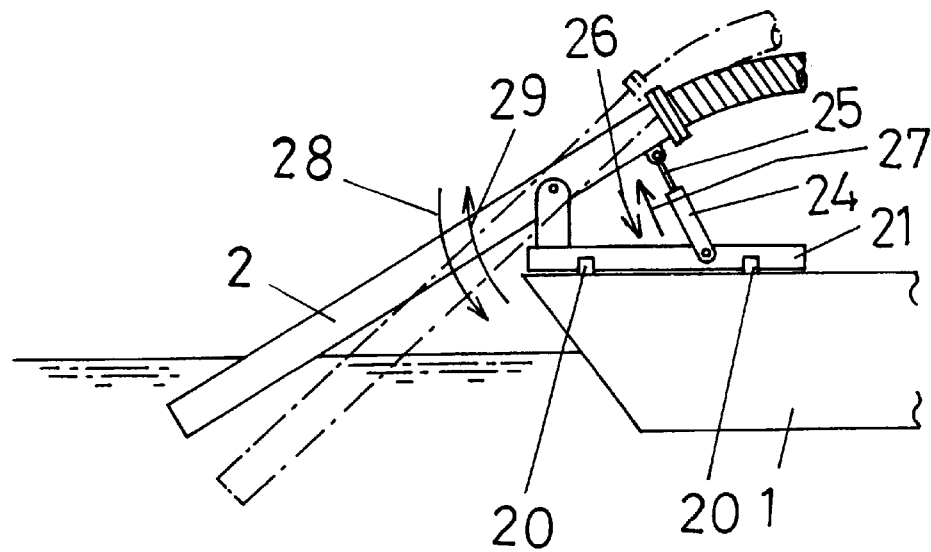
FIG. 5(a) is an enlarged side view illustrating how the angle of the suction pipe on the boat for mining the placer gold etc. is to be adjusted.
FIG. 5(b) is an enlarged side view illustrating how the length of the suction pipe on the boat for mining the placer gold etc. is to be adjusted.
Figure 5:
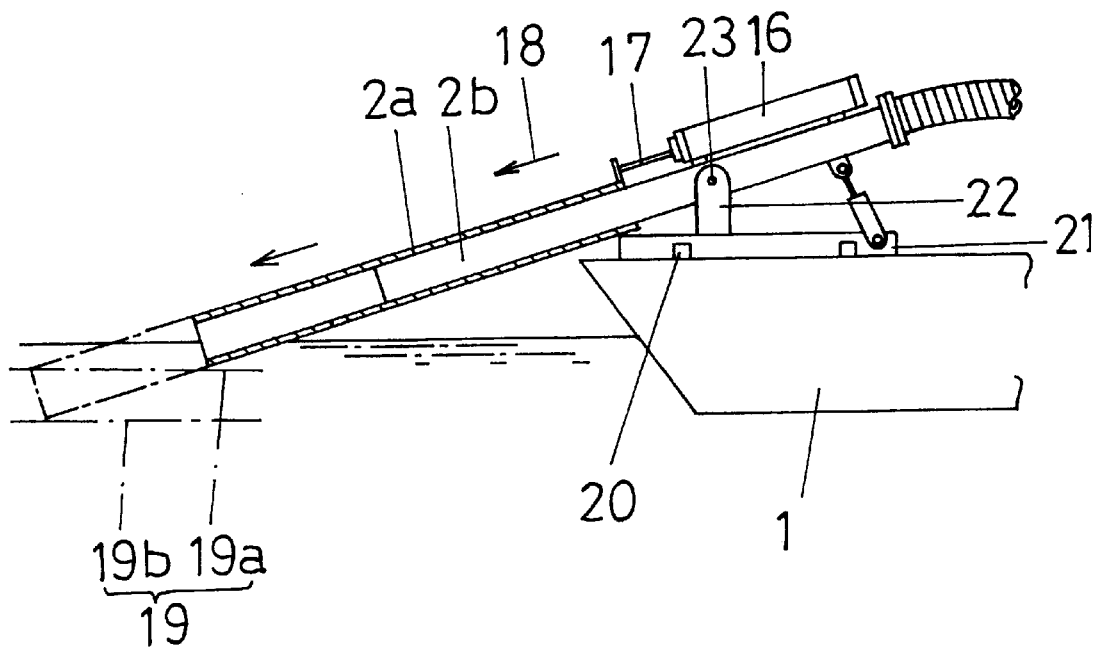

Another embodiment of the present invention is described by referring to FIG. 2.

A mixture composed of sands containing the placer gold etc. excavated by suction, or mined, from the bottom in the water is transported by a transport pipe equipped with a jet pump. The placer gold etc. are separated in a cyclone separator where the mixture is subjected to centrifugal separation, and the rest of the mixture from which the placer gold etc. have been separated is returned to the water while the placer gold etc. separated are collected and used. In accordance with the cyclone separator in this embodiment, the placer gold etc. are allowed to settle along the inner wall of the cylindrical outer container while the remainder (material other than the placer gold etc.) is allowed to settle near the center of the cylindrical outer container.

Embodiment 3

Another embodiment of the present invention is described by referring to FIGS. 3, 4, 5, 6, 7 and 8.

Figure 6:
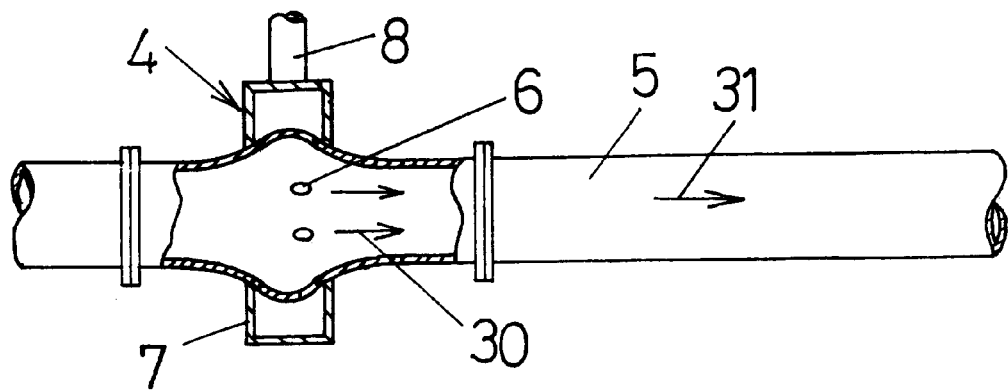
FIG. 6 is a diagram for explaining one example of a jet pump for accelerating the flow rate of a mixture, shown as partly broken away.

The base end of a suction pipe 2 is movably fixed to one side of a boat 1, and the forward end of the suction pipe 2 projects from the boat 1. One end of a hose 3 is connected to the base end of the suction pipe 2, and the other end of the hose 3 is connected to a jet pump 4. The jet pump 4 has a blow-out hole 6 for pressurized air near the connection between the hose 3 and transport pipe 5 so that the pressurized air can be supplied from an air pipe 8 into an air box 7 (FIG. 6). Separator boxes 9, 10 are disposed in series in the middle portion of the transport pipe 5 so that they can be kept spaced away from each other at a predetermined interval (FIG. 3), and a discharge hose 11 is connected to the outlet side of the last separator box 10. The discharge hose 11 projects outwardly beyond the stern of the boat 1.

In this embodiment, when a rod 12 secured to the base end of the suction pipe 2 is moved in the direction of an arrow 14 or 15 by supplying or removing the pressurized air to or from an air cylinder 13 (FIG. 4), the suction pipe 2 is also moved in the same direction. Therefore, the forward end of the suction pipe 2 may be arranged so as to excavate by suction the sand layer that has the same width as that of the boat 1. As regards the depth of the forward end of the suction pipe 2, the sands on the bottom of the river may be excavated by suction from the upper layer toward the lower layer, for example, by adjusting the angle as shown in FIG. 5(a), or by dividing the suction pipe 2 into an outer pipe 2a and an inner pipe 2b and extending the outer pipe 2a slidably with regard to the inner pipe 2b. An air cylinder 16 may be fixed on the inner pipe 2b, and the outer pipe 2a may be secured to the end of the rod 17 of the air cylinder 16. In this way, the rod 17 may be extended in the direction of an arrow 17, by delivering the pressurized air into the base end side of the air cylinder 16. Thus, the sands may be excavated by suction from the upper layer 19a toward the lower layer 19b of the sand layer 19.

A traveling stand 21 is mounted on rails 20 on the boat 1, and the suction pipe 2 is pivotally fixed to a bracket 22 on the traveling stand 21 by means of a shaft 23 so that it can rotate about the shaft 23. The base end of the air cylinder 24 may be fixed on the traveling stand 21, and the forward end of the rod 25 of the air cylinder 24 may be fixed to the suction pipe 2. In this way, the rod 25 may be moved in the direction of an arrow 26 or 27 by supplying or removing the pressurized air into or from the air cylinder 24, so that the suction pipe 2 can be swung about the shaft 23 in the direction of an arrow 28 or 29. In this way, the angle or length of the suction pipe 2 may be adjusted.

Figure 7:
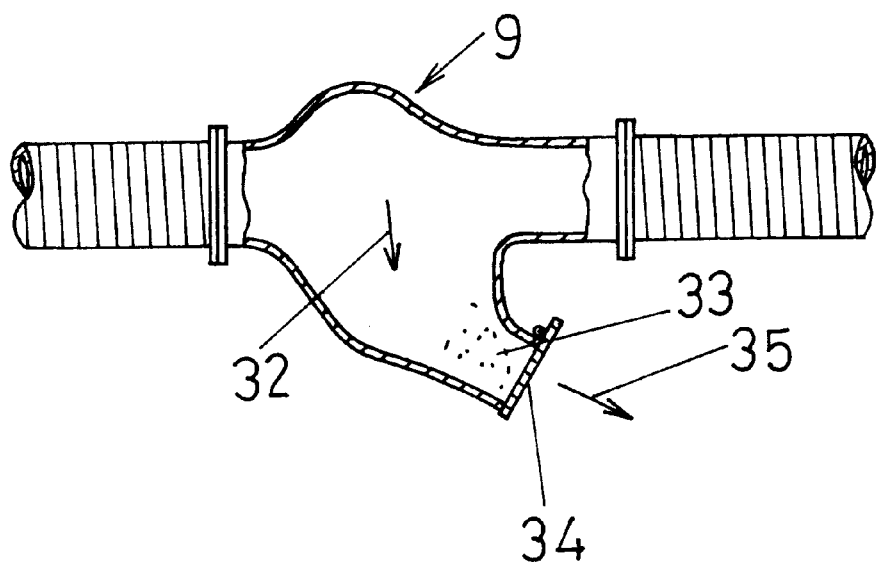
FIG. 7 is a diagram for explaining one example of a separator box as the separator means using the difference in the specific gravity, shown as partly broken away.

Referring next to FIG. 6, when the pressurized air is supplied to the air pipe 8 of the jet pump 4, and the pressurized air is blown out from the outlet port 6 in the direction of an arrow 30, the mixture of the sand containing the placer gold etc. and water may be accelerated, flowing in the same direction, e.g., flowing in the direction of an arrow 31, for example, at the rate of 3 m/sec. Upon reaching the separator box 9, where the separator box 9 is formed by enlarging the cross sectional area of the transport pipe 5, the mixture reduces its flow rate. Then, the placer gold etc. contained in the mixture (or, particularly, the placer gold etc. having relatively gross sizes) cannot continue to flow there at the same rate as before, and are thus allowed to settle due to the specific gravity, as indicated by an arrow 32 (FIG. 7). When the mixture then reaches the separator box 10, the rest of the placer gold etc. remaining in the mixture, which have relatively less gross sizes, is allowed to settle there.

As described before, the placer gold etc. are mostly separated within the separator boxes 9 and 10. The precision of the separation depends upon the conditions of the placer gold etc. (such as the external shapes, grain sizes and the like), and to what degree the flow rate is to be changed. As required, however, the number of separator boxes may be increased, or the flow rate may be changed greatly. The placer gold etc. 33 thus accumulated within the separator boxes may be removed as indicated by an arrow 35, by opening the cover 34 (FIG. 7).

Embodiment 4

Figure 8:
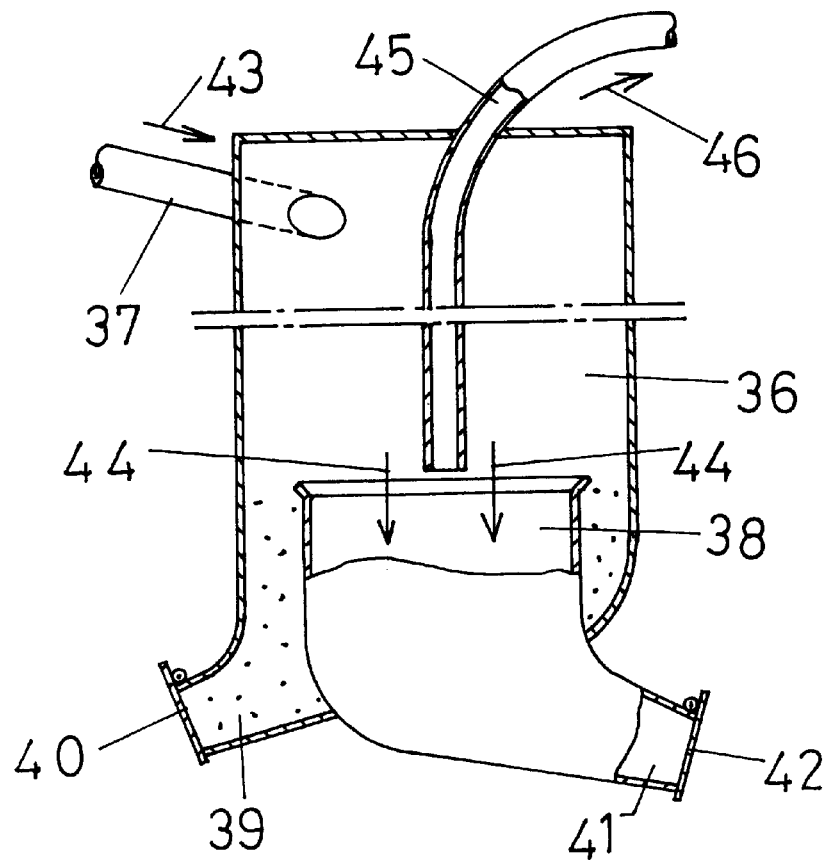
FIG. 8 is an enlarged sectional view showing one example of the embodiment of the separator means using the centrifugal separation, with some parts omitted.
Figure 9:
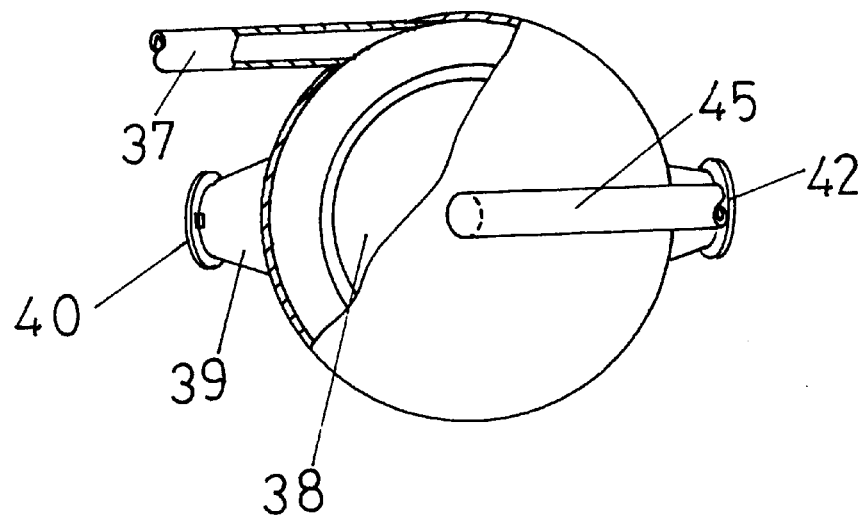
FIG. 9 is an enlarged plan view showing the separator means shown in FIG. 8, as partly broken away.

Another embodiment of the present invention is described by referring to FIGS. 8 and 9.

A transport pipe 37 is connected to the upper lateral wall of a cylindrical outer container 36 such that it extends in the tangential direction and obliquely downward. Inside the lower portion of the cylindrical outer container 36, there is an inner container 38 which is kept spaced at some distance from the inner wall of the cylindrical outer container 36. The cylindrical outer container 36 has a funnel 39 contiguously on the bottom thereof, which is equipped with a lid 40 at the bottom end that is capable of opening and reclosing. The inner container 38 also has a funnel 41 contiguously on the bottom thereof, which is also equipped with a lid 42 at the bottom end thereof that is capable of opening and reclosing.

In this embodiment, when a mixture of sands containing the placer gold etc. and water is blown in under the applied air pressure from the transport pipe 37, as indicated by an arrow 43 (e.g., at the rate of 5 m/sec.), the mixture moves around spirally along the inner wall of the cylindrical outer container 36, allowing the particles having the greater specific gravity in the mixture (such as the placer gold etc.) to settle along the inner wall of the cylindrical outer container 36, until those particles have finally built up within the funnel 39. Those particles having the smaller specific gravity (other than the placer gold etc.) are allowed to settle near the center as indicated by an arrow 44, until those particles have finally built up within the funnel 41. They are discharged together with water through a discharge pipe 45 to the outside. Thus, the centrifugal separation by the cylindrical outer container 36 can take place both smoothly and continuously.

The lids 40 and 42 may be opened at any convenient time to remove the accumulated placer gold etc.

Embodiment 5

Figure 10:
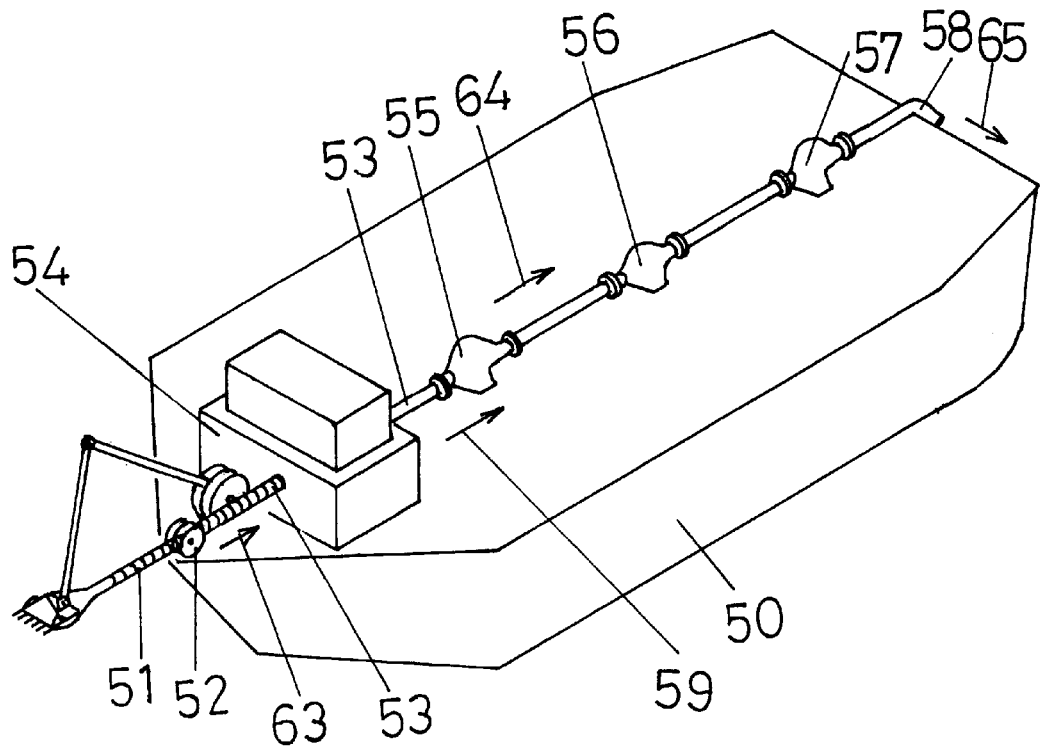
FIG. 10 is a perspective view for explaining another boat for mining the placer gold etc. according to the present invention.
Figure 11:
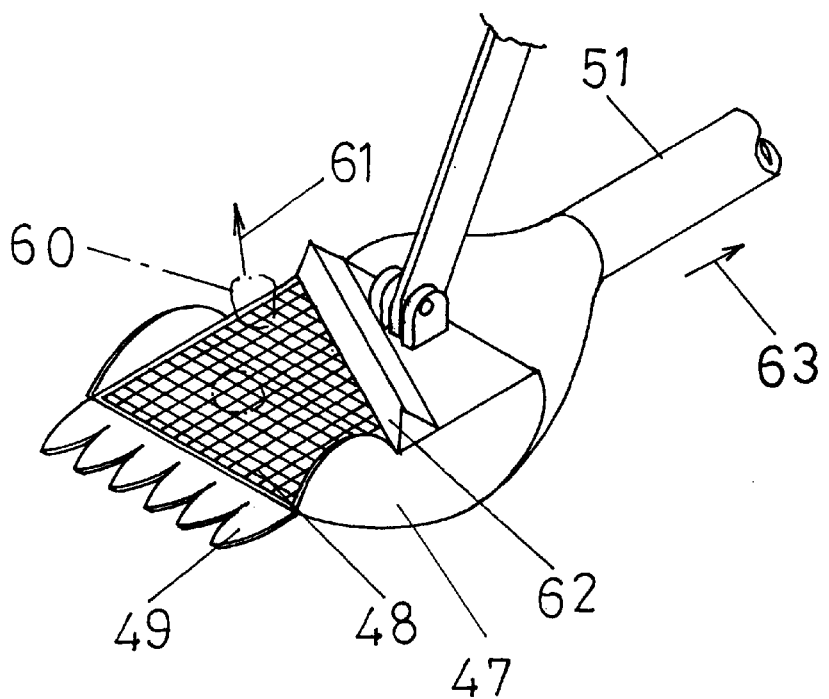
FIG. 11 is an enlarged perspective view for illustrating the forward end of the suction excavating means on the boat for mining the placer gold etc. shown in FIG. 10.

Another embodiment of the present invention is described by referring to FIGS. 10 and 11.

The base end of a suction pipe 51 is rotatably mounted to a bracket 52 on the bow end of a boat 50, and is also connected to one end of a transport pipe 53 which passes through a pump room 54 and is then connected to separator boxes 55, 56, and 57 serially one after another. A discharge hose 58 is connected to the separator box 57.

To the forward end of the suction pipe 51 are connected an excavating blade 49 and a suction box 47 with a separator net 48 on its backside.

In this embodiment, when a force is applied to the water inside the transport pipe 53 by a transport pump (or a jet pump) so the water can flow in the direction of an arrow 59, sands are drawn from the suction box 47 as indicated by an arrow 63, and lumps which are larger than the meshes of the separator net 48 are let to drop out of the net. In this case, those large lumps are guided by a guide member 62 and will not stay on the net. Those sands which have passes through the separator net 48 enter into the suction box 47 and through the suction pipe 51 into the transport pipe 53, as indicated by an arrow 63, and then pass through the separator boxes 55, 56 and 57 sequentially. Finally, the sands are discharged through the discharge hose 58 as indicated by an arrow 65. The boat 50 may be anchored to the water bottom or may be traveling very slowly, as required, while the suction operation is under way.

As the mixture of the sands and water through the transport pipe 53 passes through the separator boxes 55, 56, and 57 in the manner as described, it is separated within each of the separator boxes by making use of the difference in the specific gravity as described in connection with FIG. 7 in Embodiment 3, and the placer gold etc. which are allowed to settle and accumulated on the bottom of the separator boxes 55, 56 and 57 can be collected as good quality placer gold etc. without having to perform the second-time separation and third-time separation.

Embodiment 6

Figure 12:
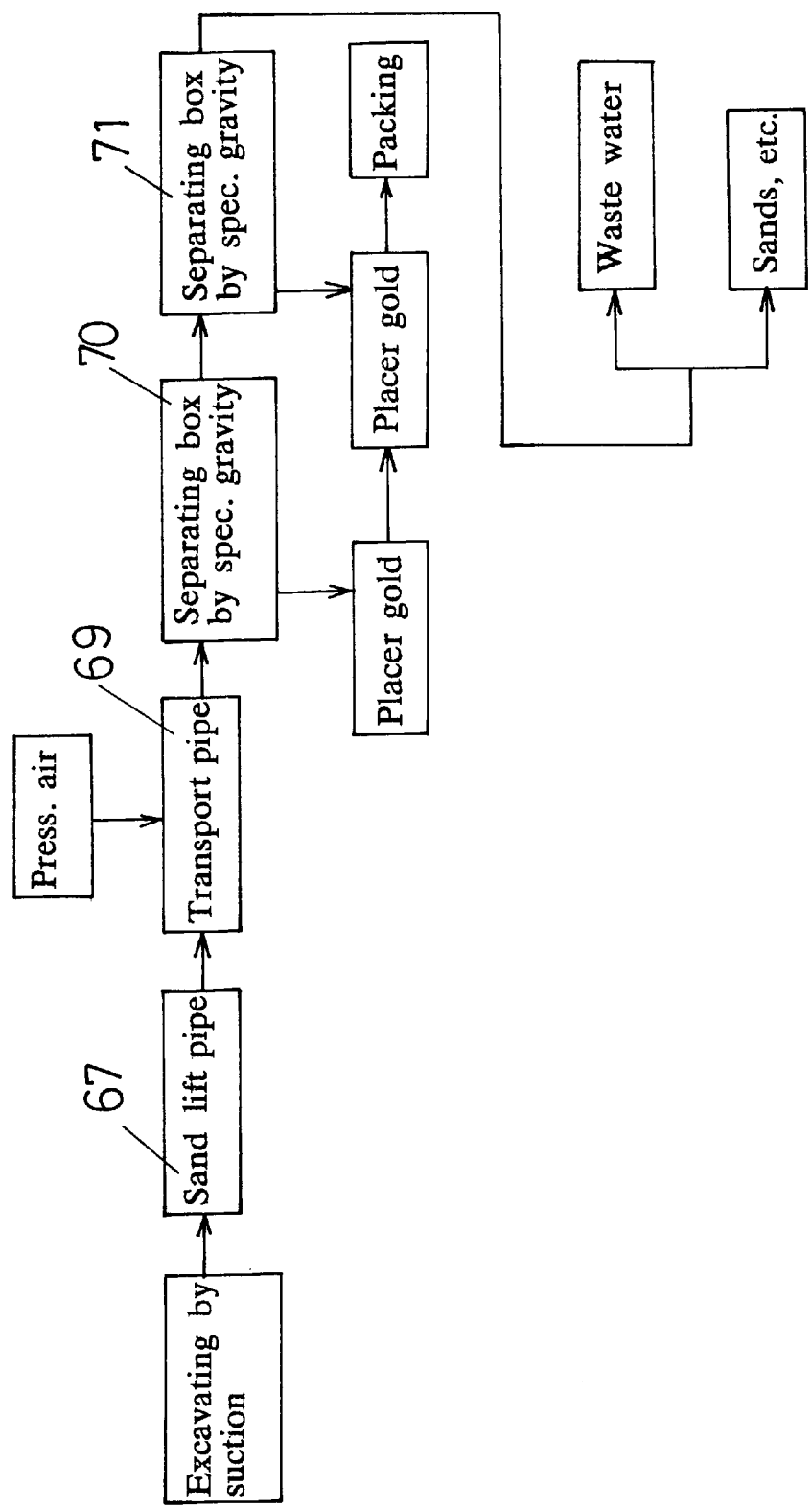
FIG. 12 is a block diagram showing the embodiment of the method for mining and separating the placer gold etc. according to the present invention.
Figure 13:
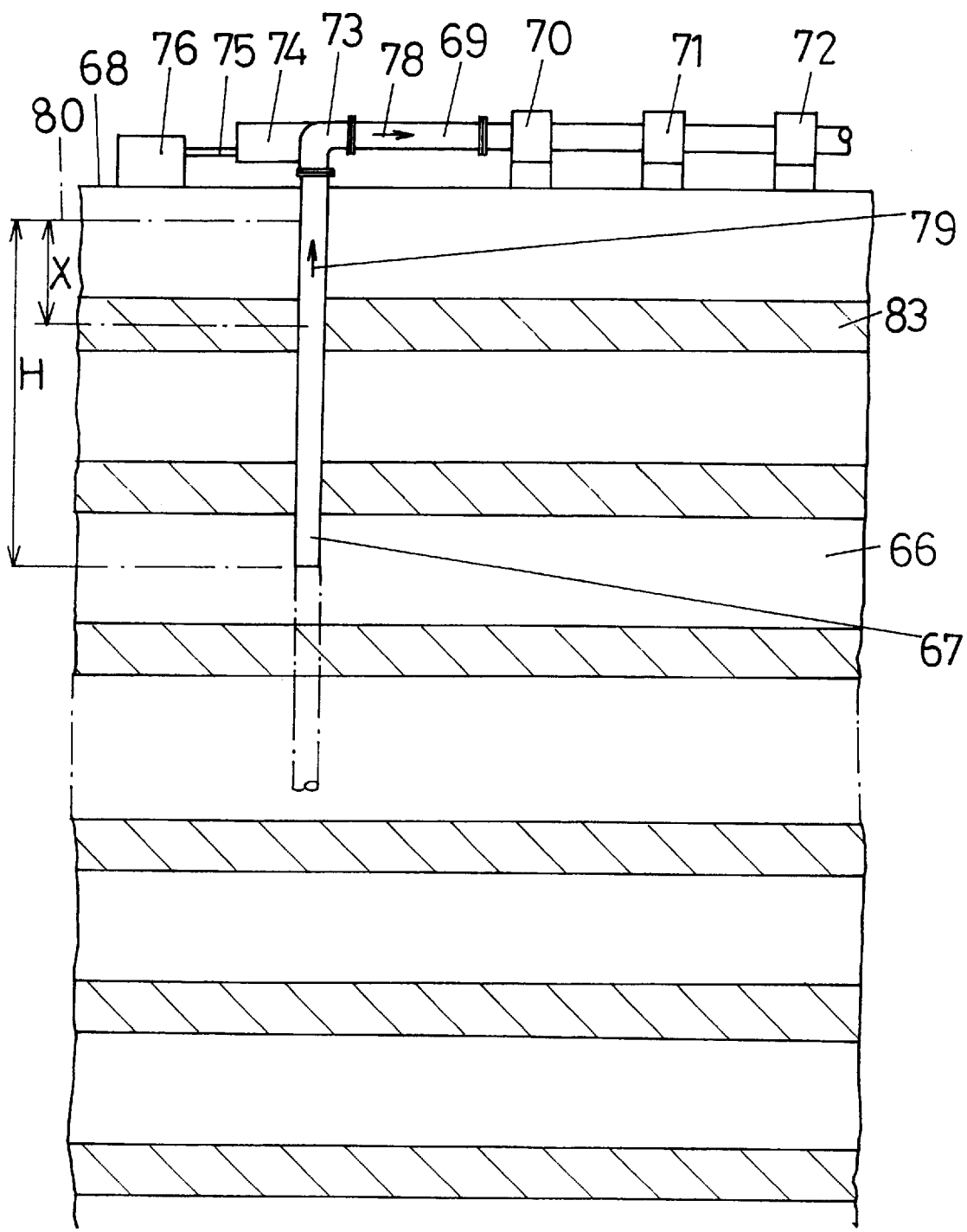
FIG. 13 is a cross sectional view of the system for mining and separating the placer gold etc. according to the present invention, illustrating how the mining is performed with some parts omitted.
Figure 14:
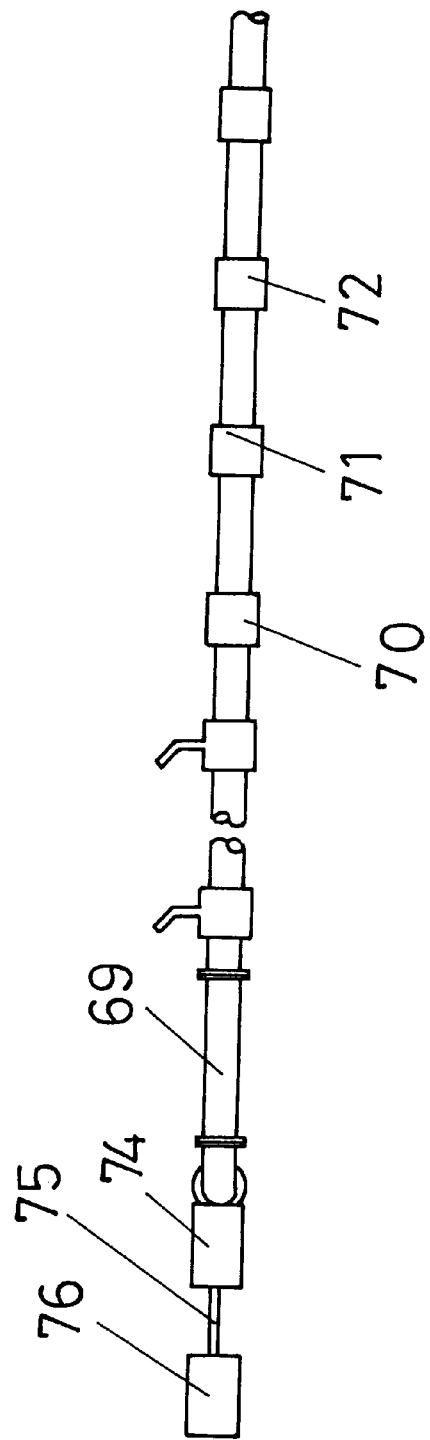
FIG. 14 is a plan view showing the system for mining and separating the placer gold etc. according to the present invention, with some parts omitted.
Figure 15:
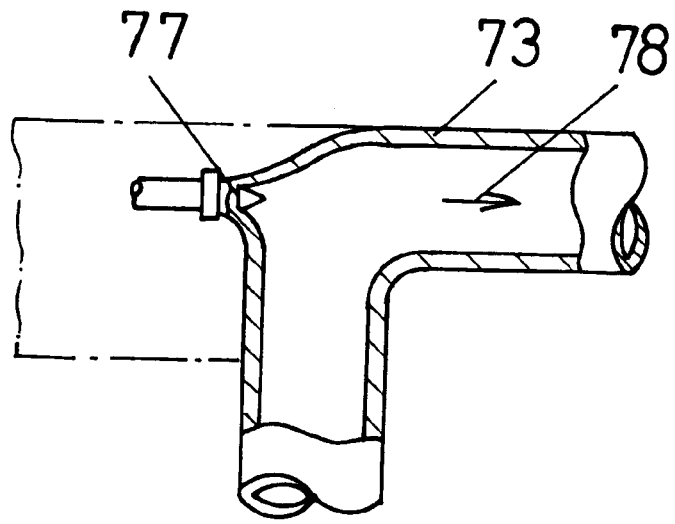
FIG. 15 is an enlarged view showing, as partly broken away, tile embodiment of the flow rate accelerating means in the system for mining and separating the placer gold etc. according to the present invention.
Figure 16:
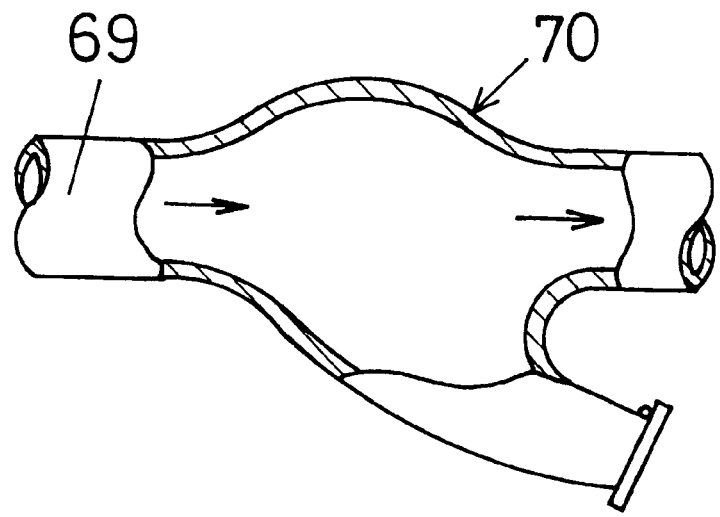
FIG. 16 is an enlarged view showing, as partly broken away, the embodiment of the separator means using the difference in the specific gravity in the system for mining and separating the placer gold etc. according to the present invention.

An embodiment of the method of the present invention is described by referring to FIGS. 12 and 13. A sand layer 66 in the earth is excavated by suction, is brought up to the ground surface level 68 by means of a sand lifting pipe 67, and is transported to a transport pipe 69 laid along the ground surface 68. An accelerator device is attached to this transport pipe 69, which can increase the flow rate of the mixture of sands containing the placer gold etc. and water by supplying a pressurized air. For example, the mixture can flow at the rate of 3 m/sec. To the transport pipe 69 are connected separator boxes 70, 71 in series which are spaced at a predetermined interval, for separating the placer gold etc. by making use of the difference in the specific gravity. The separator boxes 70, 71 are not limited to two, but the number of separator boxes to be used may be determined by considering any flow rate variation so that the separation of the placer gold etc. by making use of the difference in the specific gravity can be performed efficiently. The separation of the placer gold etc. by making use of the difference in the specific gravity within the separator boxes 70, 71 may proceed in the manner as described by referring to FIG. 7 in Embodiment 3.

When the separation by making use of the difference in the specific gravity occurs as described above, the water and the placer gold etc. may be separated, and if required, sands may be separated according to the different particle sizes. The placer gold etc. thus collected may be allotted and packaged for the commercial sales, or may be transferred to any subsequent processing step.

Embodiment 7

An embodiment of the system of the present invention is described by referring to FIGS. 13, 14, 15, 16, and 17.

The sand lifting pipe 67 is inserted from the ground surface level 68 into the earth, and the sand lifting pipe 67 and a transport pipe 69 laid on the ground surface are connected by way of a connecting pipe 73. The connecting pipe 73 has a pressurized air box 74 attached to its elbow point, and a pressurized air produced by a compressor 76 is supplied to the pressurized air box 74 through an air pipe 75. Then, the pressurized air is blown from a nozzle 77 into the connecting pipe 73 as indicated by an arrow 78, increasing the flow rate of a mixture composed of sands containing the placer gold etc. and water through the transport pipe 69 so that it can flow at a predetermined rate (e.g., 3 m/sec.). When the flow through the transport pipe 69 is thus produced as indicated by an arrow 78 in FIG. 13, an upward flow is also produced in the sand lifting pipe 67, as indicated by an arrow 79. When the flow is produced at 3 m/sec. in the transport pipe 69, a flow is also produced at the same rate in the sand lifting pipe 67, so that the amount of the mixture of the sands containing the placer gold etc. and water that corresponds to that flow rate can be excavated by suction from the bottom end of the sand lifting pipe 67.

In the foregoing description, a water pressure H is applied between the bottom end of the sand lifting pipe 67 and the water surface 80 (FIG. 13), and when the part of the mixture existing in the portion of the sand lifting pipe 67 from the water surface 80 down to Xm is removed, an additional part of the mixture may automatically refill that portion from lower part in the sand lifting pipe according to the difference between the water pressure H and the pressure in Xm. Thus, the sand lifting can be on going and the excavation by suction can occur continuously.

In the foregoing description, if the sand layer containing the placer gold etc. is subjected to a strong pressure which is stronger than the water pressure due to the deep water, it is assumed in the embodiment that there is nothing but the water pressure head. However, it is possible that the mixture of the sand and water may be jetted if a hole is made in the pressure compressed sand layer, without having to use the accelerator device using the pressurized air, that is, without having to employ the arrangement that reduces the pressure at the top end of the sand lifting pipe 67 by suction and automatically lifts the sands from the bottom end of the sand lifting pipe 67 by making use of the difference between the water pressures.

To the transport pipe 69 are connected separator boxes 70, 71 and 72 which are connected in series and spaced at a predetermined interval. The separator boxes 70, 71 and 72 each have a cross sectional area that is greater than that of the transport pipe 69, and the flow rate may be reduced at the points where the separator boxes 70, 71 and 72 are provided, in proportion to the respective cross sectional areas. As the flow rate decreases, the placer gold etc. having the greatest specific gravity are first allowed to settle, and the remainder having the next greater specific gravity are then allowed to settle, and so on. Thus, all of the placer gold etc. will finally have been separated. The relationship between the flow rate and the separation using the difference in the specific gravity described above is associated with the shapes, grain sizes and like of the placer gold etc., and so the separating efficiency may be improved further by determining it empirically.

Following the separator boxes 70, 71 and 72, a further separator means (such as the centrifugal separator, the elutriator in general, and the like) may be provided. However, it is preferred that the separation will only be performed by those separator boxes because the transport pipe has a great transporting capability, and it can be performed provided that the boxes have a sufficient processing capability.

Figure 17:
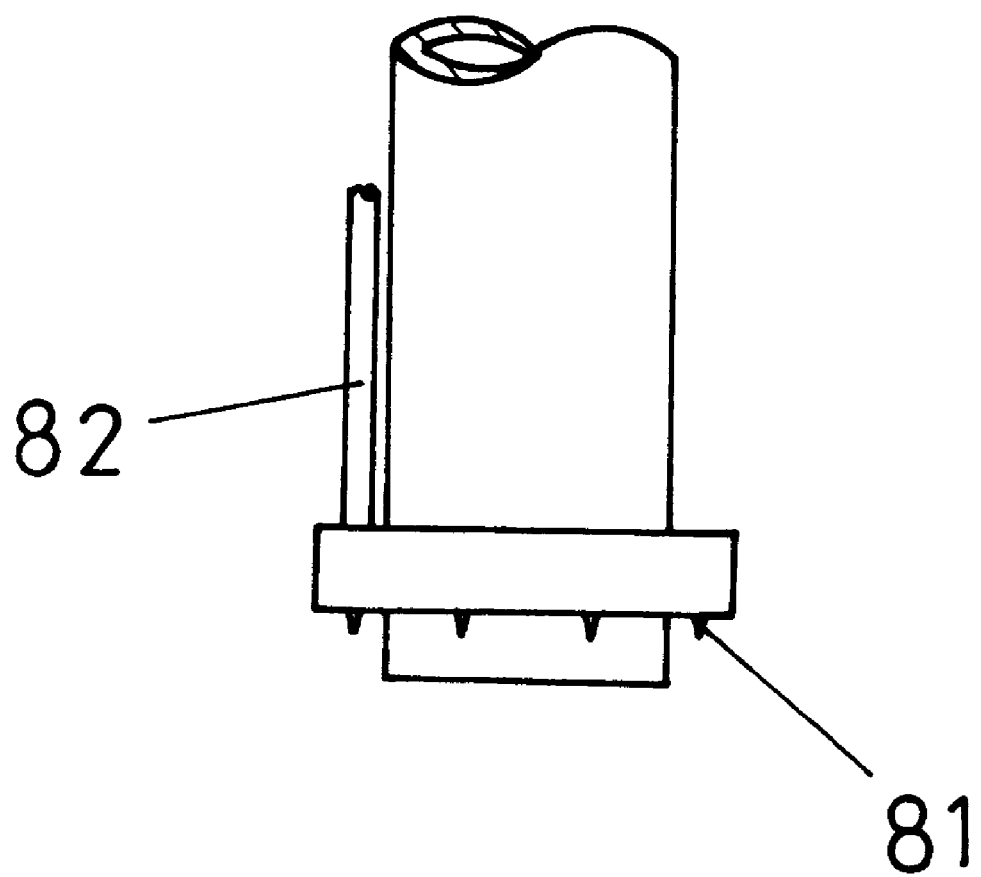
FIG. 17 is an enlarged view showing the bottom end of the embodiment of the sand lifting pipe in the system for mining and separating the placer gold etc. according to the present invention.

In this embodiment, when the forward end of the sand lifting pipe encounters a clay layer or rock layer while the sand lifting pipe is being inserted, the jet nozzle 81 may be mounted to the forward end of the sand lifting pipe, with the tip of the jet nozzle directed downwardly, as shown in FIG. 17. A highly pressurized water may then be delivered from the jet nozzle 81 through a pressure resistant pipe 82. In this way, the clay layer 83 or rock layer can be crushed and bored easily, and the sand lifting pipe can progress deeper into the earth.

Embodiment 8

Figure 18:
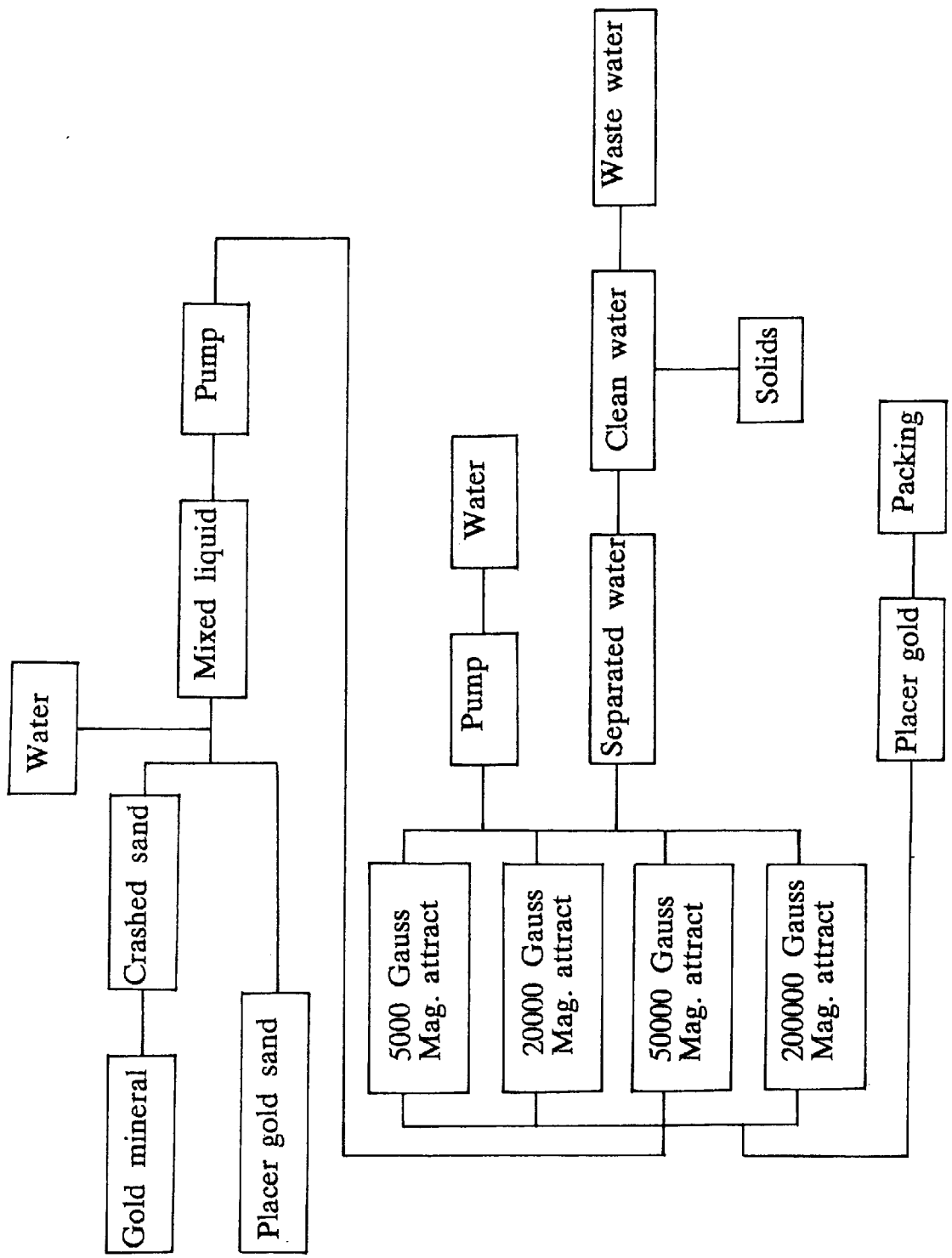
FIG. 18 is a block diagram showing the embodiment of the method for separating the placer gold etc. using the magnetic field according to the present invention.

An embodiment of the present invention is described by referring to FIG. 18. An amount of water totaling 85% (by weight) is added to the placer gold etc. obtained by mining a placer gold bed or the crushed sands etc. obtained by crushing a placer gold mineral, and a mixture is thus obtained. A flow drive force is applied to this mixture by means of a pump, or by using a pressurized fluid (pressurized air, pressurized water jet) so that the mixture can be delivered into a metallic cylindrical container through a delivery pipe (for example, at the flow rate of 1 m/sec.). When the cross sectional area of the metallic cylindrical container is set to 10 times that of the delivery pipe, the flow rate of the mixture within the metallic cylindrical container is equal to 10 cm/sec. Around the metallic cylindrical container are arranged, sequentially in the direction of the flow of the mixture, a plurality of magnetic field generator means (such as solenoid coil units) which produce a magnetic field of a difference strength, such as 5000 gauss, 20000 gauss, 50000 gauss, 200000 gauss, and so on.

Those magnetic field generator units are energized for producing the respective magnetic fields while the metallic cylindrical container is rotated slowly (5 to 10 rpm). In this way, the ferromagnetic particles of ferromagnetic substances (for example, Fe, Mn etc.) will be magnetically attached to the portion of the inner wall of the metallic cylindrical container that corresponds to the area where the magnetic field of 5000 gauss is produced. The placer gold etc. or gold mineral contained in the mixture will be magnetically attached to the portions of the inner wall of the metallic cylindrical container that correspond to the areas where the magnetic fields of 20000 gauss, 50000 gauss and 200000 gauss, respectively, according to the respective strength of they magnetism of the placer gold etc. or gold mineral.

In the foregoing description, the magnetic field generator units (for example, solenoid coil units) are deenergized just before the magnetic attachment of the placer gold etc. within the metallic cylindrical container becomes saturated, making the magnetic fields disappear. Then, a cleaning fluid is delivered under the applied pressure into the metallic cylindrical container (for example, at the flow rate of 10 kg per square centimeter under the pressure). Thus, the placer gold etc. magnetically attached to the inner wall of the metallic cylindrical container will be removed from the metallic cylindrical container together with the cleaning fluid.

In the above, when the magnetic attachment of the placer gold etc. only in the areas where one or two solenoid coil units are located becomes saturated (for example, this may be detected by a timer which begins the automatic operation), only the solenoid coil units in those areas may be deenergized, making the magnetic fields disappear. Then, the placer gold etc. magnetically attached there may be removed.

As the operation is automatically controlled such that even when the 5000 gauss magnetic field becomes saturated, the 20000 gauss magnetic field will next attract magnetically, and when the 20000 gauss magnetic field becomes saturated, the 50000 gauss magnetic field will next attract magnetically, and so, it may be found that the magnetic attachment is effective as long as no placer gold etc. remain in the mixture being removed via the metallic cylindrical container.

The distribution of substances such as the placer gold etc. existing in the placer gold bed has originally been determined from the placer gold bed, and the content and quality of the placer gold etc. may be determined by performing the separation beforehand. Thus, the saturation of the magnetically attached substances may be known in advance, and may be automatically controlled by a timer.

In the above, the metallic cylindrical container is rotated slowly while the mixture is flowing and the magnetic field generator units are actuated. However, the placer gold etc. in the mixture may be magnetically attached to the inner wall of the metallic cylindrical container, and may then be separated, without having to rotate the container.

The mixture formed by mixing the placer gold etc. mined and separated according to the methods and systems described in connection with FIGS. 1 through 7 in the preceding embodiments together with water may be separated further by using the method described in the embodiment. In doing so, the placer gold and gold mineral can be separated with a higher precision and with a higher efficiency.

Embodiment 9

Figure 19:
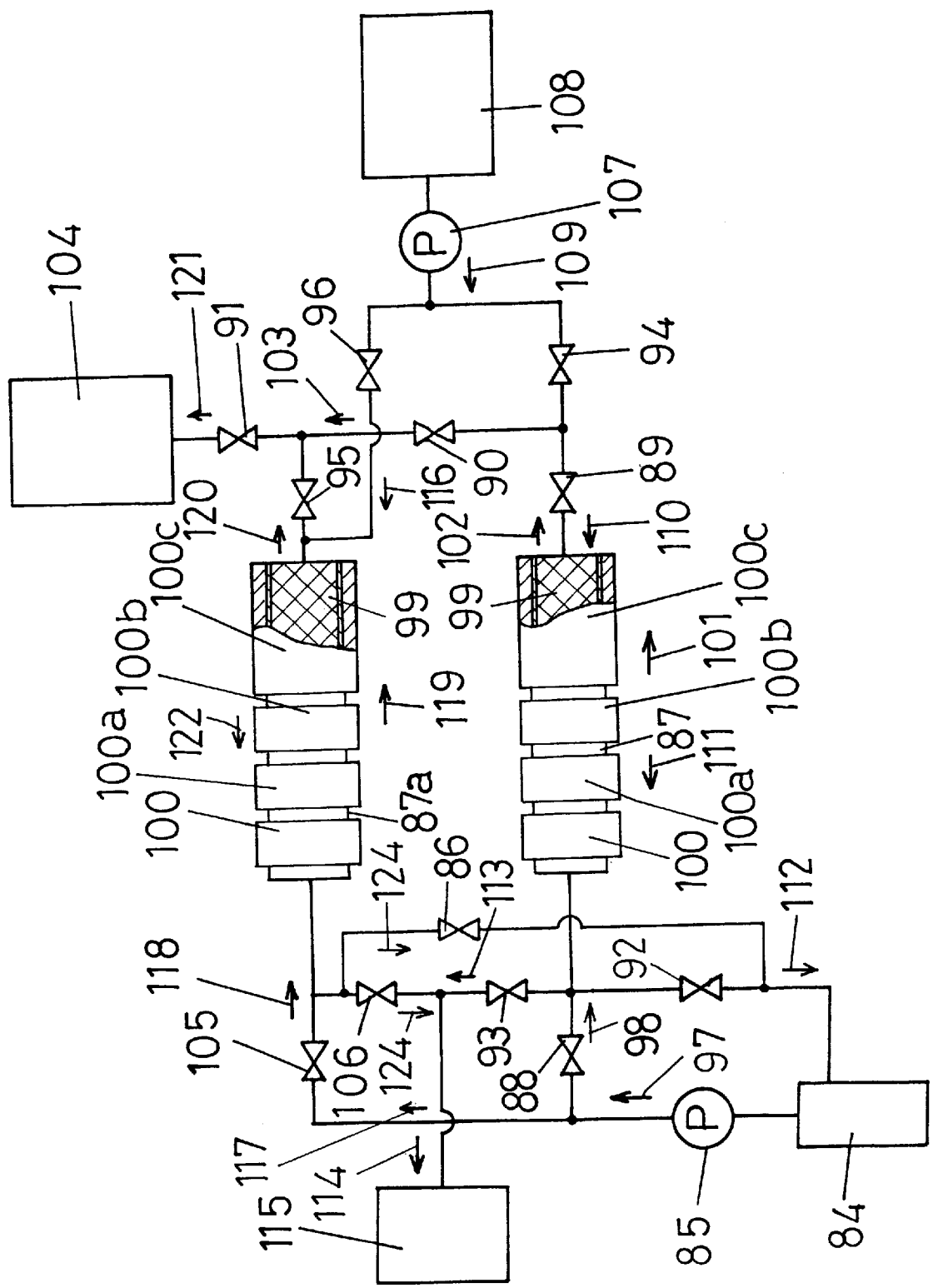
FIG. 19 is a conceptual diagram showing the embodiment of the system for separating the placer gold etc. using the magnetic field according to the present invention.

A system of the present invention is described by referring to FIG. 19. To the placer gold etc., or the crushed particles obtained by crushing the gold mineral, is added an adequate amount of water (for example, 85% (by weight)), and a mixture is thus obtained. This mixture is then delivered from a tank 84 into a metallic cylindrical container 87 by means of a pump 85. In this case, when valves 88, 89, 90 and 91 are opened, and valves 92, 93, 94, 95 and 105 are closed, the mixture is introduced into the metallic cylindrical container 87 as indicated by arrows 97, 98. The metallic cylindrical container is made of stainless steel, and several sets of solenoid coil units 100, 100a, 100b, 100c are arranged sequentially around the outer periphery of the container. Those solenoid coil units 100, 100a, 100b, 100c provide magnetic forces that get stronger as the mixture flows toward the downstream side, for example, the solenoid coil unit 100 provides 5000 gauss, the solenoid coil unit 100a provides 20000 gauss, the solenoid coil unit 100b provides 50000 gauss, and the solenoid coil unit 100c provides 200000 gauss. The solenoid coil units 100, 100a, and 100b have the same width, and the solenoid coil unit 100c is two times as wide as the others. Thus, some of the placer gold etc. (for example, such as gold particles attached to iron particles) that are more ferromagnetic may ten to be magnetically attached to the portion of the inner wall of the metallic cylindrical container 87 which corresponds to the area where the solenoid coil unit 100 for providing a magnetic field of 5000 gauss is located. Alternatively, some of the placer gold etc. (for example, such as gold particles, and the placer gold to which the placer gold particles and nonferromagnetic minerals are attached) that are less ferromagnetic may tend to be magnetically attached to the portion of the inner wall of the metallic cylindrical container 87 which corresponds to the area where the solenoid coil unit 100c for providing a magnetic field of 200000 gauss is located.

In the above, a means is provided for rotating the metallic cylindrical containers 87, 87a slowly (5 to 10 rpm), and this means may be arranged such that the metallic cylindrical containers 87, 87a can be rotated slowly (5 to 10 rpm) while the mixture is flowing inside the metallic cylindrical containers 87, 87a during which the solenoid coil units 100 etc. are energized to generate the respective magnetic fields. In this way, the placer gold etc. may be magnetically attached to the respective inner peripheral walls of the metallic cylindrical containers 87, 87a uniformly.

As described above, the placer gold which is less ferromagnetic, and the placer gold attached to the ferromagnetic minerals (for example, iron) may all be magnetically attached to the portions of the inner wall of the metallic cylindrical container 87 that correspond to the areas where the solenoid coil units 100, 100a, 100b, and 100c are located, and are separated from the mixture. The rest of the mixture from which the placer gold etc. have thus been separated will be delivered to an outlet tank 104 through valves 89, 90, 91, as indicated by arrows 102, 103, 121. When the placer gold etc. magnetically attached to the inner wall of the metallic cylindrical container 87 become saturated, the valves 88, 90 are closed (as indicated by the timer, for example), while the valves 105, 95 are opened and the valves 86, 96, 106 are closed. Then, the mixture will enter the metallic cylindrical container 87*a,* as indicated by arrows 97, 117, 118, and the rest of the mixture separated from the magnetically attached placer gold etc., which was contained in the mixture, is delivered to the outlet tank 104 through the valves 95, 91, as indicated by arrows 119, 120, 121.

When the valves 94, 92 are then opened and the pump 107 is started, a cleaning water is delivered under pressure (for example, 10 kg per square centimeter) from the water tank 108, as indicated by arrows 109, 110, 111, 112, and a mixture liquid within the metallic cylindrical container 87 is returned to the tank 84.

When the mixture liquid has thus been returned, the valve 92 is closed while the valve 93 is opened, and all of the solenoid coil units 100, 100*a,* 100*b* and 100*c* around the metallic cylindrical container 87 are deenergized. After all of the solenoid coil units on the metallic cylindrical containers have been deenergized and the magnetic attachment of the placer gold etc. has been removed, the cleaning water is delivered from the pump 107, causing the placer gold etc. magnetically attached to the inner wall of the metallic cylindrical container 87 to flow together with the cleaning water as indicated by arrows 110, 112, 113 and 114. Finally, this flow enters a collector tank 115, and one step of the process including the magnetic attachment, separation and collection of the placer gold etc. is completed.

In the meantime, the magnetic attachment of the placer gold etc. on the side of the metallic cylindrical container 87*a* becomes saturated (this is detected by the timer). At this time, it is preferred that the placer gold etc. magnetically attached to the cylindrical container 87 will have been removed off by the cleaning water and have been delivered to the collector tank 115). The valves 93, 94, 95, 105 are then closed while the valves 88, 90 are opened, thus, a mixture liquid is delivered by the pump 85 to the metallic cylindrical container 87 as described above, and the placer gold etc. are magnetically attached to the inner wall of the metallic cylindrical container 87. Then, the remaining part of the mixture liquid is discharged to the outlet tank 104.

When the valves 86, 96 are opened and the pump 107 is started, the cleaning water is delivered from the water tank 108 into the metallic cylindrical container 87*a,* as indicated by arrows 109, 116, and the rest of the mixture remaining within the metallic cylindrical container 87*a* is returned to the tank 84 as indicated by arrows 122, 123, 112. When the mixture within the metallic cylindrical container 87*a* has thus been cleaned off, the valve 86 is closed while the valve 106 is opened, and all of the solenoid coil units 100, 100*a,* 100*b* and 100*c* around the metallic cylindrical container 87*a* are powered off and deenergized. Then the magnetic attachment on the metallic cylindrical container disappears, and the placer gold etc. magnetically attached are delivered with the cleaning water and collected into the collector tank 115.

The mixture thus collected into the collector tank 115 is separated into solid and liquid part, and only the placer gold etc. are then picked up and packaged.

In this embodiment, all of the placer gold etc. magnetically attached to the portions of the inner wall of the metallic cylindrical container 87 and 87*a* that correspond to the areas where the solenoid coil units are located around the metallic cylindrical container 87 or 87*a* are removed off by the cleaning water all at once, but the magnetic field of each of the solenoid coil units may be deenergized individually, and the placer gold etc. and others which are magnetically attached to the respective inner wall portions corresponding to the areas where the solenoid coil units are located may be removed for each of the solenoid coil units.

For example, some of the placer gold beds may contain more iron sand and other ferromagnetic particles, in which case those ferromagnetic particles tend to be magnetically attached to the inner wall portion of the metallic cylindrical container 87 or 87*a* that corresponds to the area where the solenoid coil unit 100 for providing the magnetic field of 5000 gauss is located, and the placer gold which is less ferromagnetic tends to be magnetically attached to the inner wall portion of the metallic cylindrical container 87 or 87*a* that corresponds to the area where the solenoid coil unit 100*b* or 100*c* for providing the magnetic field of 50000 gauss or 200000 gauss. Thus, if only the solenoid coil unit 100*b* or 100*c* for providing the magnetic field of 50000 gauss or 200000 gauss is deenergized, only the placer gold may be captured, and may automatically be separated from the other ferromagnetic particles.

The final process performed by the method and system described in the preceding embodiments 1 through 7 may be followed by the system described in this embodiment, wherein the placer gold etc. that have been mined and separated by the method and system described in the embodiments 1 through 7 may be mixed with water to form a mixture, and the method described in this embodiment may then be used to separate the mixture further. In this way, the placer gold and other gold minerals can be separated with a higher precision and with a higher efficiency.

What is claimed is:

1. A method of mining and separating placer gold, comprising:

inserting a lifting pipe into the earth until a bottom end of the lifting pipe reaches a predetermined depth, wherein a sand mixture including placer gold and water is located at the predetermined depth;

sucking the sand mixture up through the lifting pipe to an elbow in a top end of the lifting pipe at a surface of the earth, said sucking being accomplished by supplying a jet stream to the sand mixture at the elbow in the lifting pipe so as to accelerate a flow rate of the sand mixture through the lifting pipe;

conveying the sand mixture from the elbow in the top end of the lifting pipe through a horizontal transport pipe;

separating an intermediate mixture including placer gold from the sand mixture by varying a flow rate of the sand mixture through the transport pipe so that the intermediate mixture having a greater specific gravity than a remainder of the sand mixture settles out of the sand mixture during periods of slow flow rate due to the greater specific gravity;

mixing the intermediate mixture with water so as to form a second intermediate mixture including water, wherein the second intermediate mixture comprises 70% to 90%; and separating a placer gold material from the second intermediate mixture by conveying the second intermediate mixture through a magnetized cylinder such that a magnetic force of the magnetized cylinder holds the placer gold material to an inner wall of the magnetized cylinder, wherein the magnetic force along a longitudinal axis of the magnetized cylinder ranges from 5000 gauss to 200000 gauss.

2. The method of claim 1, wherein said inserting of the lifting pipe into the earth comprises delivering a highly pressurized jet of water in a downward direction from a bottom end of the lifting pipe.

3. The method of claim 1, wherein said sucking of the sand mixture up through the lifting pipe comprises supplying a jet stream of compressed air through a nozzle and into the elbow at a right angle to the lifting pipe and in a direction of the transport pipe.

4. The method of claim 1, wherein said separating of the intermediate mixture from the sand mixture by varying the flow rate comprises conveying the sand mixture through a plurality of separator boxes arranged in series in the transport pipe, each of the separator boxes having a greater cross-sectional area than the transport pipe.

5. The method of claim 1, wherein said separating of the placer gold material from the second intermediate mixture by conveying the second intermediate mixture through a magnetized cylinder comprises rotating the magnetized cylinder about the longitudinal axis of the magnetized cylinder as the second intermediate mixture is conveyed through the magnetized cylinder.

6. The method of claim 1, wherein said separating of the placer gold material from the second intermediate mixture by conveying the second intermediate mixture through a magnetized cylinder comprises increasing the magnetic force along a length of the magnetized cylinder such that the magnetic force at an outlet end of the magnetized cylinder is greater than a magnetic force at an inlet end of the magnetized cylinder.

7. An apparatus for mining and separating placer gold, comprising:
   a lifting pipe for conveying a sand mixture including placer gold and water, said lifting pipe having a bottom end, a top end, and an elbow at said top end;
   a transport pipe for conveying the sand mixture, and having an inlet end coupled to said elbow of said lifting pipe;
   an accelerator component arranged at said elbow to supply a jet stream in a flow direction of the sand mixture so as to accelerating a flow rate of the sand mixture conveyed through said transport pipe and so as to reduce a pressure at said top end of said lifting pipe;
   a plurality of separator boxes arranged in series in said transport pipe, each of said separator boxes having a greater cross-sectional area than said transport pipe so that a flow rate of the sand mixture through said transport pipe is varied, whereby an intermediate mixture including placer gold and having a greater specific gravity than a remainder of the sand mixture settles out in each of said separator boxes during periods of slow flow rate due to the greater specific gravity, each of said plurality of separator boxes having a funnel for collecting the intermediate mixture that settles out, said funnel of each of said separator boxes having an outlet port and a cover mounted on said outlet port for allowing said funnel to be opened and closed;
   a mixing component for mixing the intermediate mixture collected from said funnel of each of said separator boxes with water so as to form a second intermediate mixture;
   a magnetic separator including a cylindrical container and a plurality of electromagnetic coils arranged on an exterior of said cylindrical container, each of said electromagnetic coils being individually controlled and producing a magnetic field of a different magnitude, said electromagnetic coils being sequentially arranged along said cylindrical container such that an electromagnetic coil producing a magnetic field of a lowest magnitude is positioned at an inlet end of said cylindrical container and an electromagnetic coil producing a magnetic field of a highest magnitude is positioned at an outlet end of said cylindrical container; and
   a delivery mechanism for delivering the second intermediate mixture to said magnetic separator, whereat a placer gold material is separated from the second intermediate mixture due to the magnetic field of said electromagnetic coils holding the placer gold material to an inner wall of said cylindrical container.

8. The apparatus of claim 7, further comprising a cleaning fluid tank and a cleaning fluid pump for delivering a cleaning fluid from said cleaning fluid tank to said cylindrical container.

9. The apparatus of claim 7, wherein said lifting pipe includes a jet nozzle at said bottom end.

10. The apparatus of claim 7, wherein said accelerator component includes an air compressor connected to a nozzle in said elbow, said nozzle being arranged in said elbow so as to supply a jet stream of compressed air into said elbow at a right angle to said lifting pipe and in a direction of said transport pipe.

* * * * *